(No Model.)
W. H. WOODMAN.
HORSE SHOER'S IMPLEMENT.
No. 440,454.          Patented Nov. 11, 1890.
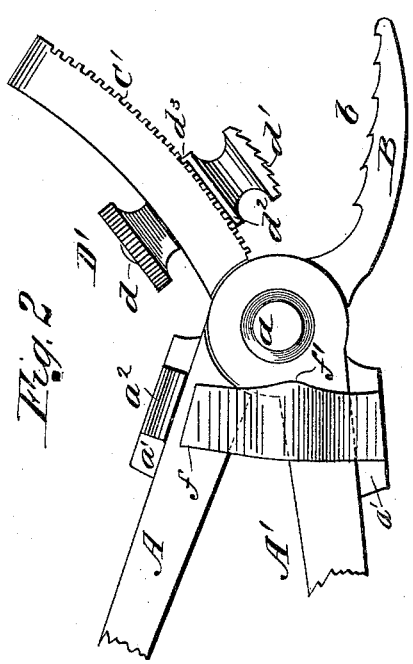
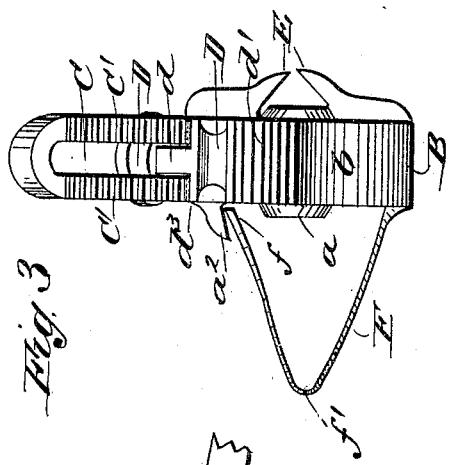
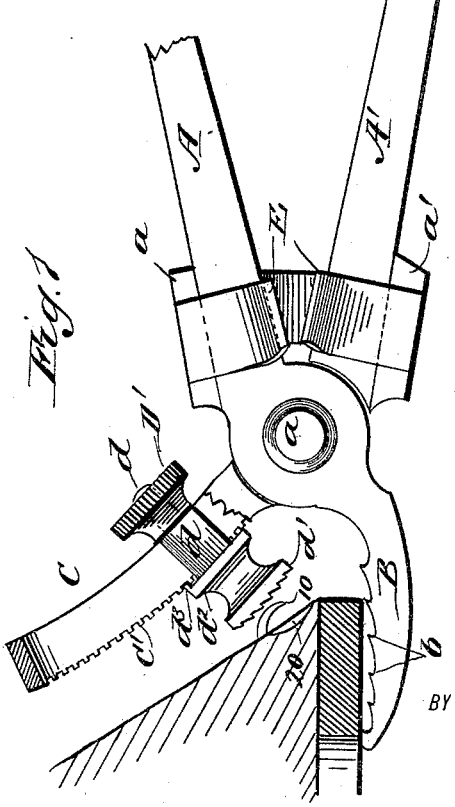

UNITED STATES PATENT OFFICE.

WILLIAM H. WOODMAN, OF COLUMBIA, SOUTH DAKOTA.

HORSESHOER'S IMPLEMENT.

SPECIFICATION forming part of Letters Patent No. 440,454, dated November 11, 1890.

Application filed December 4, 1889. Serial No. 332,538. (No model.)

*To all whom it may concern:*

Be it known that I, WILLIAM H. WOODMAN, of Columbia, in the county of Brown, State of South Dakota, have invented a new and Improved Horseshoer's Implement, of which the following is a full, clear, and exact description.

The object of the invention is to provide a combined implement for the use of horseshoers, which shall include jaws for clinching the nail-point, nippers for cutting off the same, and a gouge for forming a depression in the wall of the hoof for receiving the clinched point of the nail.

Reference is to be had to the accompanying drawings, forming a part of this specification, in which similar letters of reference indicate corresponding parts in all the figures.

Figure 1 is a side view of a horseshoer's implement embodying my invention, parts being broken away, the view showing the use of the implement in clinching a nail. Fig. 2 is a similar view of the opposite side, and Fig. 3 is a front view of the implement.

Referring to the parts, A A' represent the handles of the tool on the one A of which beyond the pivot $a$ is formed the jaw B, which is formed with serrations $b$, and is adapted to be brought to bear against the under side of a hoof when clinching a nail, as illustrated in Fig. 1. On the other handle A' the companion jaw C of jaw B is formed, and is outwardly or upwardly curved, as shown, and longitudinally slotted, as at $c$. On the inner edge or face of the jaw C at each side of the slot $c$ thereof are formed serrations $c'$.

In the slot $c$ rides the shank $d$ of an adjustable block D, the toothed face $d'$ of which is preferably curved, and on the shoulder $d^2$ of the block is formed a tooth or bead $d^3$, which enters one of the serrations $c'$ of jaw C upon the tightening of the binding-nut D' on the threaded end of the shank $d$ against the back of the jaw C. By thus constructing the clincher the adjustable block may be quickly shifted, when desired, to bring it to bear on the nail, as 10, and owing to the uneven walls not infrequently found in hoofs the adjustability of the block is a very desirable feature of the invention; also, as is well known, the walls of hoofs vary very much in shape, some being almost vertical, while others are distinctly inclined, and the adjustable block of my invention may be brought to bear on the nail regardless of the peculiarities of the hoof, whereas the jaw of an ordinary clincher is liable to contact with the wall of the hoof at a point distant from the projecting nail.

In the rear of the pivot $a$ of the handles the latter are provided with nippers E E for cutting off the points of the nails in removing an old shoe or the nail thereof, the said nippers being preferably formed on enlargements $a'$ $a'$ of the said handles.

To one of the handles, as A', and preferably to the enlargement $a'$ thereof, is fixedly secured one leg of a gouge F, which approximates an arch in form, the opposite leg of which gouge terminates, as at $f$, in proximity to the handle A of the clincher in position to be acted upon by a lug or projection $a^2$ on said handle when the two handles are grasped and brought toward each other. Thus the said gouge acts as a spring to normally maintain the handles in a separated position, and the jaws consequently in the open position. At the apex of the arched gouge or union of its legs, as at $f'$, the same is sharpened for gouging out a depression, as 20, in the hoof, into which depression the clinched point of the nail is pressed by the clinching-jaws, thus leaving the nail flush with the wall of the hoof. As the legs of the gouge approach each other at an angle, the sharpened portion thereof is of small width, and the gouging out of the hoof may be effected to the desired extent and without removing more of the hoof than the amount necessary to form the slight depression necessary for the reception of the nail-point.

In the implement above described are combined therefore an effective clincher, a gouge, a spring for the handles, and nippers, whereby the farrier is enabled to expeditiously perform his work.

Having thus described my invention, what I claim as new, and desire to secure by Letters Patent, is—

1. A combination implement for horseshoers, comprising clinching-jaws and a bowed spring normally acting to open said jaws and sharpened to form a gouge, substantially as described.

2. The herein-described combination implement for horseshoers, comprising clinching-jaws, one of which is provided with an adjustable block, nippers on the handle of said jaws, and a laterally-projecting bowed spring acting normally to open the jaws and sharpened to form a gouge, substantially as described.

WILLIAM H. WOODMAN.

Witnesses:
G. W. STREETER,
C. W. ATKINS.